United States Patent
Cantrell et al.

(10) Patent No.: US 11,610,175 B2
(45) Date of Patent: *Mar. 21, 2023

(54) AUTONOMOUS ROBOT DELIVERY SYSTEMS AND METHODS

(71) Applicant: Walmart Apollo, LLC, Bentonville, AR (US)

(72) Inventors: Robert Cantrell, Herndon, VA (US); Donald High, Noel, MO (US); Michael Atchley, Eureka Springs, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,852

(22) Filed: May 26, 2022

(65) Prior Publication Data
US 2022/0300897 A1    Sep. 22, 2022

Related U.S. Application Data

(63) Continuation of application No. 16/030,939, filed on Jul. 10, 2018, now Pat. No. 11,348,057.
(Continued)

(51) Int. Cl.
*G06Q 10/08*      (2012.01)
*G06Q 10/0833*    (2023.01)
(Continued)

(52) U.S. Cl.
CPC ....... *G06Q 10/0833* (2013.01); *G05D 1/0027* (2013.01); *G05D 1/104* (2013.01);
(Continued)

(58) Field of Classification Search
CPC ..... G06Q 10/0833; G06Q 50/28; H04W 4/44; H04W 4/02; H04L 67/01; H04L 67/12; G05D 1/0027; G05D 1/104; G06F 3/0482
See application file for complete search history.

(56) References Cited

U.S. PATENT DOCUMENTS 8,346,676 B1   1/2013   Bennett
8,615,473 B2   12/2013   Spiegel
(Continued)

FOREIGN PATENT DOCUMENTS

KR    20220030811 A    3/2022
WO    2019014182 A1    1/2019

OTHER PUBLICATIONS

Fuelio: Gas log & costs—Android Apps on Google Play, https://play.google.com/store/apps/details?id=com.kajda.fuelio&hl=en, last viewed Mar. 31, 2017.
(Continued)

*Primary Examiner* — David E Choi
(74) *Attorney, Agent, or Firm* — Fitch, Even, Tabin & Flannery LLP

(57) ABSTRACT

A distributed robotic delivery system includes a mobile application, a server, a dispatch module, and a plurality of robotic delivery vehicles. The mobile application receives suggested items for purchase, the suggested items selected by having a set of properties suitable for delivery by a selected one of the plurality of robotic delivery vehicles, where the set of properties includes product dimensions and weight; receives item costs to be provided to a user for the suggested items; displays the item costs; and transmits a message directing the dispatch module to deploy the selected one of the plurality of robotic delivery vehicles to deliver one or more items of the suggested items selected by the user.

20 Claims, 6 Drawing Sheets

Related U.S. Application Data

(60) Provisional application No. 62/531,576, filed on Jul. 12, 2017.

(51) Int. Cl.

| | | |
|---|---|---|
| *G06F 3/0482* | (2013.01) | |
| *G05D 1/10* | (2006.01) | |
| *G05D 1/00* | (2006.01) | |
| *G06Q 50/28* | (2012.01) | |
| *H04W 4/44* | (2018.01) | |
| *H04L 67/01* | (2022.01) | |
| *H04L 67/12* | (2022.01) | |
| *H04W 4/02* | (2018.01) | |

(52) U.S. Cl.
CPC .......... *G06F 3/0482* (2013.01); *G06Q 50/28* (2013.01); *H04L 67/01* (2022.05); *H04W 4/44* (2018.02); *H04L 67/12* (2013.01); *H04W 4/02* (2013.01)

(56) References Cited

U.S. PATENT DOCUMENTS

| | | | |
|---|---|---|---|
| 8,712,924 | B2 | 4/2014 | Marks |
| 9,448,718 | B2 | 9/2016 | Howard |
| 9,494,937 | B2 | 11/2016 | Siegel |
| 9,792,576 | B1 * | 10/2017 | Jamjoom .............. B64C 39/024 |
| 10,198,749 | B1 | 2/2019 | Haskin |
| 10,467,581 | B2 | 11/2019 | Laury |
| 11,348,057 | B2 | 5/2022 | Cantrell |
| 2008/0010223 | A1 | 1/2008 | Hoffman |
| 2013/0060712 | A1 | 3/2013 | Esmaili |
| 2014/0279657 | A1 | 9/2014 | Stowe |
| 2015/0290795 | A1 * | 10/2015 | Oleynik ................. B25J 9/0081 |
| | | | 700/257 |
| 2016/0321600 | A1 * | 11/2016 | Abutbul ............... G06Q 20/208 |
| 2017/0075962 | A1 | 3/2017 | Hitchcock |
| 2017/0124576 | A1 * | 5/2017 | Lagoni .................... H04L 67/02 |
| 2017/0154302 | A1 * | 6/2017 | Streebin .................. G06T 17/30 |
| 2017/0169385 | A1 | 6/2017 | High |
| 2017/0220979 | A1 * | 8/2017 | Vaananen ............. G06Q 20/10 |
| 2019/0019143 | A1 * | 1/2019 | Cantrell ................. H04W 4/44 |
| 2020/0134555 | A1 * | 4/2020 | Anand .................. G06F 16/252 |
| 2022/0027847 | A1 | 1/2022 | Loubriel |
| 2022/0044198 | A1 | 2/2022 | Meister |
| 2022/0130265 | A1 | 4/2022 | Bash |

OTHER PUBLICATIONS

International Search Report and Written Opinion from related International Patent Application No. PCT/US2018/041394 dated Oct. 4, 2018.

PCT; App. No. PCT/US2018/041394; International Preliminary Report on Patentability dated Jan. 14, 2020; (5 pages).

Shipping Rates Manager, Developed by Decimal, https://apps.shopify.com/decimal, last viewed Mar. 31, 2017.

USPTO; U.S. Appl. No. 16/030,939; Notice of Allowance dated Feb. 1, 2022; (9 pages).

* cited by examiner

AUTONOMOUS ROBOT DELIVERY SYSTEMS AND METHODS

CROSS-REFERENCE TO RELATED PATENT APPLICATIONS

This application is a continuation of U.S. application Ser. No. 16/030,939 filed Jul. 10, 2018, which claims the benefit of U.S. Provisional Application No. 62/531,576, filed on Jul. 12, 2017, all of which are incorporated herein by reference in their entirety.

BACKGROUND

Unmanned Aerial Vehicles (UAVs) and Autonomous Ground Vehicles (AGVs) can be used delivery physical objects. The UAVs can be used to deliver goods and services but can be underutilized due to perceived expense.

SUMMARY

In accordance with embodiments of the present disclosure, a UAV can be deployed through a system including a user device executing an application. The user device communicates with a database attached server to present a user with multiple delivery options for a desired product and with various factors that can aid the user in selecting one of the options. The various factors can include opportunity costs, which include personal users' costs to acquire the desired product. Upon selection of the desired delivery option for the product, the application notifies the server which in turn connects with a dispatch module. The dispatch module receives the relevant data about the product and selected delivery method and dispatches an appropriate robotic delivery mechanism, including UAV or AGV to deliver the desired product to the user.

In accordance with embodiments of the present disclosure, a UAV can be deployed through a system including a user device executing an application. The user device communicates with a database attached server to present a user with multiple delivery options for a desired product and with various factors that can aid the user in selecting one of the options. The various factors can include opportunity costs, which include personal users' costs to acquire the desired product. Upon selection of the desired delivery option for the product, the application notifies the server. The server recalls past behavior of the user from a database, compares the required weight and volumetric dimensions of past purchased items and determines if any of the items would provide additional value within the confines of the currently selected delivery method. The server then provides the application with instructions to display an option to include these past items in the current delivery. The application notifies the server of the user's selection, which in turn connects with a dispatch module. The dispatch module receives the relevant data about the item and selected delivery method and dispatches an appropriate robotic delivery mechanism, including UAV or AGV to deliver the desired item to the user.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is an automated UAV/AGV delivery system that provides a user with a true total cost of multiple delivery options, which include traditional delivery services, autonomous robotic delivery services by UAV/AGV, as well as user self-help service costs. Traditional delivery services can include ground freight or overnight third party delivery services.

Figure 1:
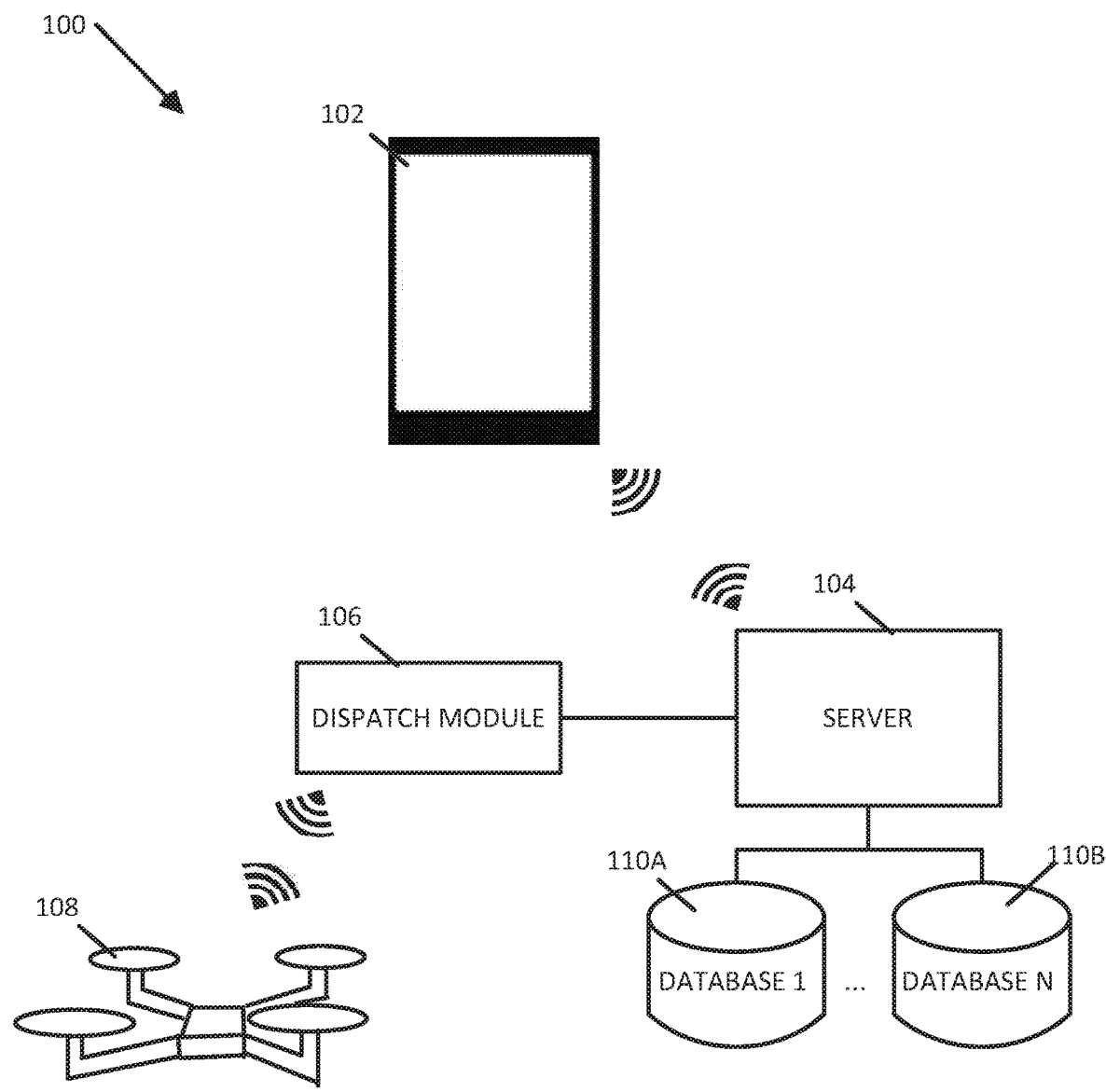
FIG. 1 is a block diagram illustrating a system for the deployment of a robotic delivery vehicle based on a message from a mobile application according to an exemplary embodiment.

FIG. 1 is a block diagram illustrating a system 100 for the deployment of one or more robotic delivery vehicles 108 based on a message from a mobile application according to an exemplary embodiment. The system 100 provides infrastructure support for providing a user true cost information prior to the delivery of an order, as well as facilitating/triggering the automated delivery of an order when a user desires that delivery option. The system 100 allows the user to see total cost factors for obtaining a product personally, and displays a side-by-side comparison to inform the user of costs associated with obtaining the product of which the user may not be aware.

A mobile device 102 provides an interface into the system 100 for the user. The mobile device 102, portrayed in this embodiment as a smart phone, can include any mobile computing device not limited to a smart phone, tablet, laptop PC, or wearable computing device. The mobile device 102 can include circuitry, such as a GPS receiver, to ascertain location information from a global positioning satellite system.

The mobile device 102 can be communicatively coupled to a server 104 directly or via a communications network. For example, the mobile device 102 can communicate with the server via radio frequency (RF) or infrared (IR) communication. In an exemplary embodiment, communication between the mobile device 102 and the server 104 can be established through a wireless data network infrastructure such as Long Term Evolution (LTE) for cellular mobile devices, WiFi (e.g., based on IEEE 802.11a-n), or any other suitable mode for wireless communication. For embodiments in which communication between the mobile device 102 and the server 104 is indirectly established via a communications network, the mobile device can communicate with the communication network using (LTE) for cellular mobile devices, WiFi (e.g., based on IEEE 802.11a-n), or any other suitable mode for wireless communication. Likewise, the server 104 can include wireless communication capabilities to connect directly with the mobile device 102. Alternatively, the server 104 can communicate with the mobile device 102 through communication network where the connection is maintained indirectly.

The server 104 can access any number of databases 110A, 110B. The databases 110A, 110B, can provide information relating to a multitude of products available for sale in response to queries from the server 104. The databases 110A, 110B can collectively include data associated with, but not limited to, product descriptions, product pricing information, and product packaging dimensions. In one embodiment, the product pricing information can be included in the database 110A, while the product description and product packaging dimensions can be stored in the database 110B. The databases 110A, 110B can link the respective product entries together by indexing based on identifiers correlating to the products. Utilizing multiple databases (e.g., the databases 110A, 110B) can enhance the functioning of the system by enabling scalability in search requests across the various databases simultaneously. The databases 110A, 110B can also include data associated with current weather conditions and current traffic conditions, as well as other factors that can impact delivery.

A dispatch module 106 can include a wireless communication module to provide a communication link to one or more robotic delivery vehicles 108. The inclusion of a wireless communication module can allow the dispatch module 106 to communicate real time, contemporaneously generated information to the one or more robotic delivery vehicles 108. The communication can be facilitated by but not limited to an LTE network, radio broadcast, or satellite communication system. The dispatch module 106 can take the form of computer specifically tasked with the real time functionality for controlling one or more robotic delivery vehicles. The dispatch module 106 can include the route finding capabilities for controlling the one or more robotic delivery vehicles, or alternatively, can provide only locational data to the one or more robotic delivery vehicles. The dispatch module 106 can communicate with the server 104 to receive information about any order or items selected by the user through the mobile device 102. Alternatively, the dispatch module 106 can be integrated with the server 104 where the processing device(s) of the server 104 are electrically coupled to the dispatch module through an I/O interconnect.

The one or more robotic delivery vehicles 108 can include but are not limited to UAVs or AGVs. The one or more robotic delivery vehicles 108 can include a payload bay for securing one or more products to be delivered by the one or more robotic delivery vehicles 108. Additionally, in an embodiment where the dispatch module 106 only provides a location to the one or more robotic delivery vehicles 108, the one or more robotic delivery vehicles 108 can include onboard route finding navigation functionality (e.g., based on GPS functionality and/or inertial sensors, such as accelerometers and gyroscopes). The one or more robotic delivery vehicles 108 can include sensors for error detection and correction. In the event of system abnormalities or system failures, the one or more robotic delivery vehicles 108 can detect errors using the sensors and avert damage to the one or more robotic delivery vehicles 108, people, or property nearby.

Figure 2:
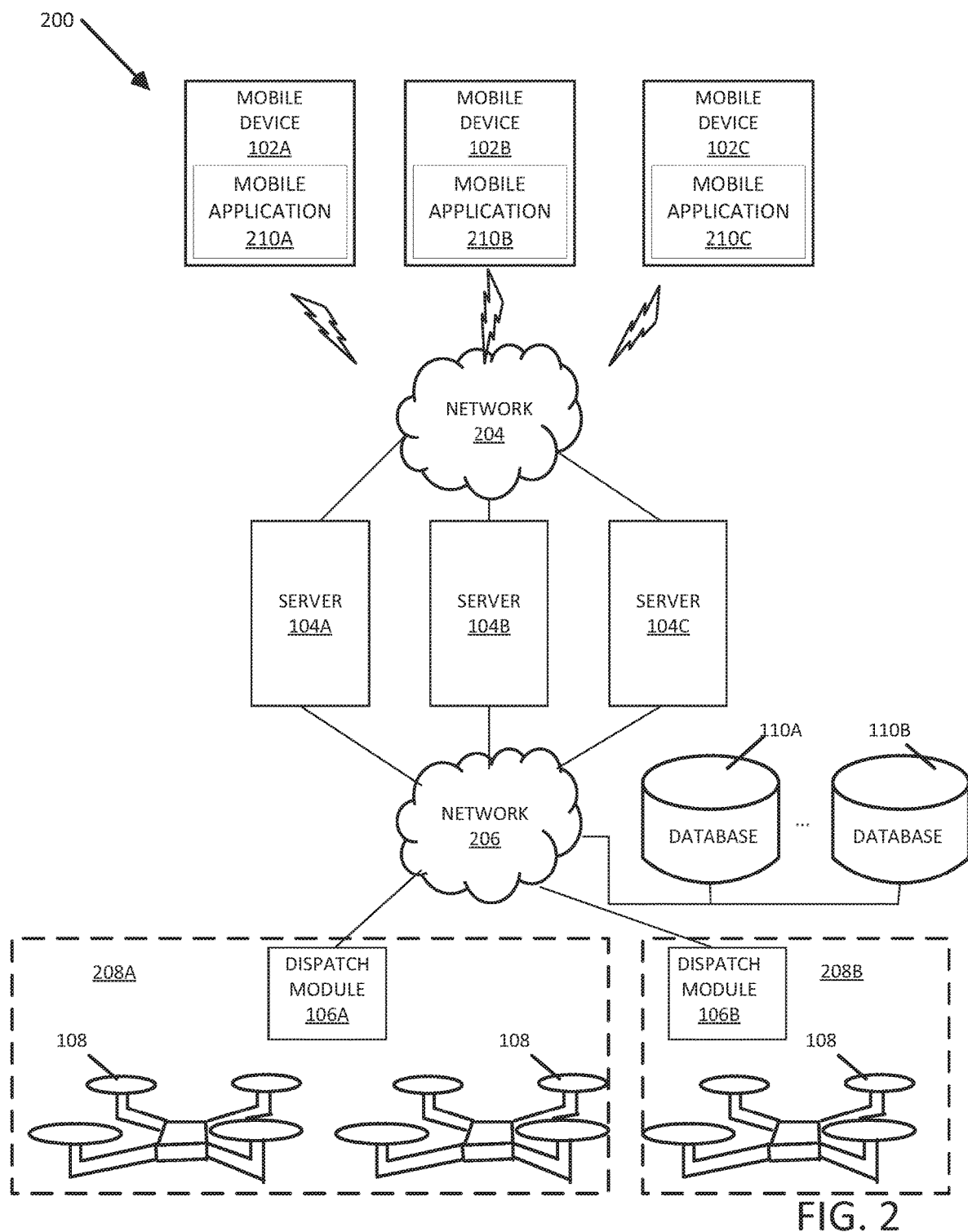
FIG. 2 is a block diagram illustrating a distributed system for the deployment of robotic delivery vehicles according to an exemplary embodiment.

FIG. 2 is a block diagram 200 illustrating a distributed system for the deployment of a plurality of robotic delivery vehicle according to an exemplary embodiment.

A plurality of mobile devices 102A, 102B, and 102C connect to a network 204. The plurality of mobile devices can be of varying hardware specification. On each of the plurality of mobile devices 102A, 102B, 102C, a connection to the network 204 can be supported. The connection can be wireless as illustrated, but also can be physically wired. The plurality of mobile devices 102A, 102B, 102C can be operable to execute a mobile application 210A, 210B, 210C capable of deploying robotic delivery vehicles. In one embodiment, the mobile application 210A, 210B, 210C can be a native application for each of the plurality of mobile devices 102A, 102B, 102C or it can be a common application accessible through a common interface such as a web browser, or third party application.

In one embodiment, the network 204 can be a wide area network (WAN) or the Internet. The network 204 can be operable to transport data packets compatible with the plurality of mobile devices 102A, 102B, 102C. In one embodiment, compatible data packets can include data packets with transmission control protocol (TCP) or user datagram protocol (UDP) routing information, as well as an accessible application layer. The network 204 can interface with other networks or servers 104A, 104B, 104C. The network 204 can be a combination of wired and wireless connection inclusively.

The servers 104A, 104B, 104C can be capable of handling a request from the plurality of mobile devices 102A, 102B, 102C. The servers 104A, 104B, 104C can be configured to operate as a single virtual server or alternatively as individual servers capable of load balancing requests from the plurality of mobile devices 102A, 102B, 102C. In another embodiment, the servers 104A, 104B, 104C can be allocated for handling only certain categories of requests. In another embodiment, the servers 104A, 104B, 104C can handle requests from discrete geographic areas. In another embodiment, the servers 104A, 104B, 104C can be virtual machines (VMs) executing on common hardware. The plurality of mobile devices 102A, 102B, 102C can recognize each of the VMs as independent systems, rather than logical servers on the same host.

A second network 206, attached to the servers 104A, 104B, 104C, provides support connecting a dispatch module 106A, to other network components such as databases 110A, 110B, as well another dispatch module 106B where both dispatch modules 106A, 106B are located in different facilities 208A, 208B. The second network 206 can be an internal network where access to the second network can be limited or restricted. The second network 206 can physically coincide with network 204, however the second network 206 can be logically separate from the network 206. In another embodiment, the second network 206 can be physically separate from the network 206. In an embodiment, the second network 206 can take the form of an institution's intranet.

Databases 110A, 110B can be standalone, as illustrated or can physically reside on the servers 104A, 104B, 104C. In a distributed environment, the databases 110A, 110B handle requests from the servers 104A, 104B, 104C necessary to support the deployment of the robotic delivery vehicles 108. The databases 110A, 110B can collectively include product descriptions and pricing as described herein.

The dispatch modules 106A, 106B can provide the provisioning and allocation support for robotic delivery vehicles 108 via the second network 206. The provisioning and allocation support can include the identification of preferable robotic delivery vehicles 108 for the requested delivery. The dispatch modules 106A, 106B can also indicate the necessary items, their locations, and the appropriate robotic delivery vehicle in which to place the necessary item. The dispatch modules 106A, 106B can also identify the location of the necessary item in their respective facilities 208A, 208B. The dispatch modules 106A, 106B can determine the type of robotic delivery vehicle 108 to be used to deliver the necessary item, if not otherwise specified in the request. Additionally, if the specified delivery method in the request is not presently available, the dispatch modules 106A, 106B can select an alternative robotic delivery vehicle to fulfill delivery, or can respond to the servers 104A, 104B, 104C indicating an issue fulfilling the request.

Facilities 208A, 208B can include one or more dispatch modules 106A, 106B for the purpose of deploying robotic delivery vehicles 108 associated with the facilities 208A, 208B. The facilities 208A, 208B house products orderable through the mobile devices 102A, 102B, 102B as well as the robotic delivery vehicles 108 to delivery the products based on received orders. Facilities 208A, 208B can be geographically distant from one another, or in another embodiment, the facilities 208A, 208B can be a logical separation of the same physical location.

Robotic delivery vehicles 108 are deployed at the instruction of the dispatch modules 106A, 106B to deliver the necessary items. As mentioned above, robotic delivery vehicles 108 can include but are not limited to UAVs or AGVs. Multiple robotic delivery vehicles 108 can be utilized to fulfil the delivery of the necessary items. In an example operation, servers can receive requests from the mobile application 210A, 210B, 210C through the mobile device 102A, 102B, 102C. The servers 104A, 104B, 104C, can then process those requests. The processing can include identifying which items will be sourced out of which of the facilities 208A, 208B. The servers 104A, 104B, 104C can query the databases 110A, 110B over the second network 206 to identify pricing information for the selected items. Additionally, the servers 104A, 104B, 104C can be responsible for storing payment information. Servers 104A, 104B, 104C can transmit messaging back to the mobile applications 210A, 210B, 210C indicating the progress of the delivery.

The dispatch modules 106A, 106B can receive messaging from the servers 104A, 104B, 104C over the second network 206. The messaging can include information related to products to be shipped. The dispatch modules 106A, 106B determine product placement in relation to cargo compartments of the UAV/AGVs for efficient transport of products. The dispatch modules 106A, 106B can transmit navigational information to the robotic delivery vehicles 108 to facilitate delivery. Additionally the dispatch modules 106A, 106B can send messages back to the servers 104A, 104B, 104C over the second network 206 providing real-time status of deliveries.

Figure 3:
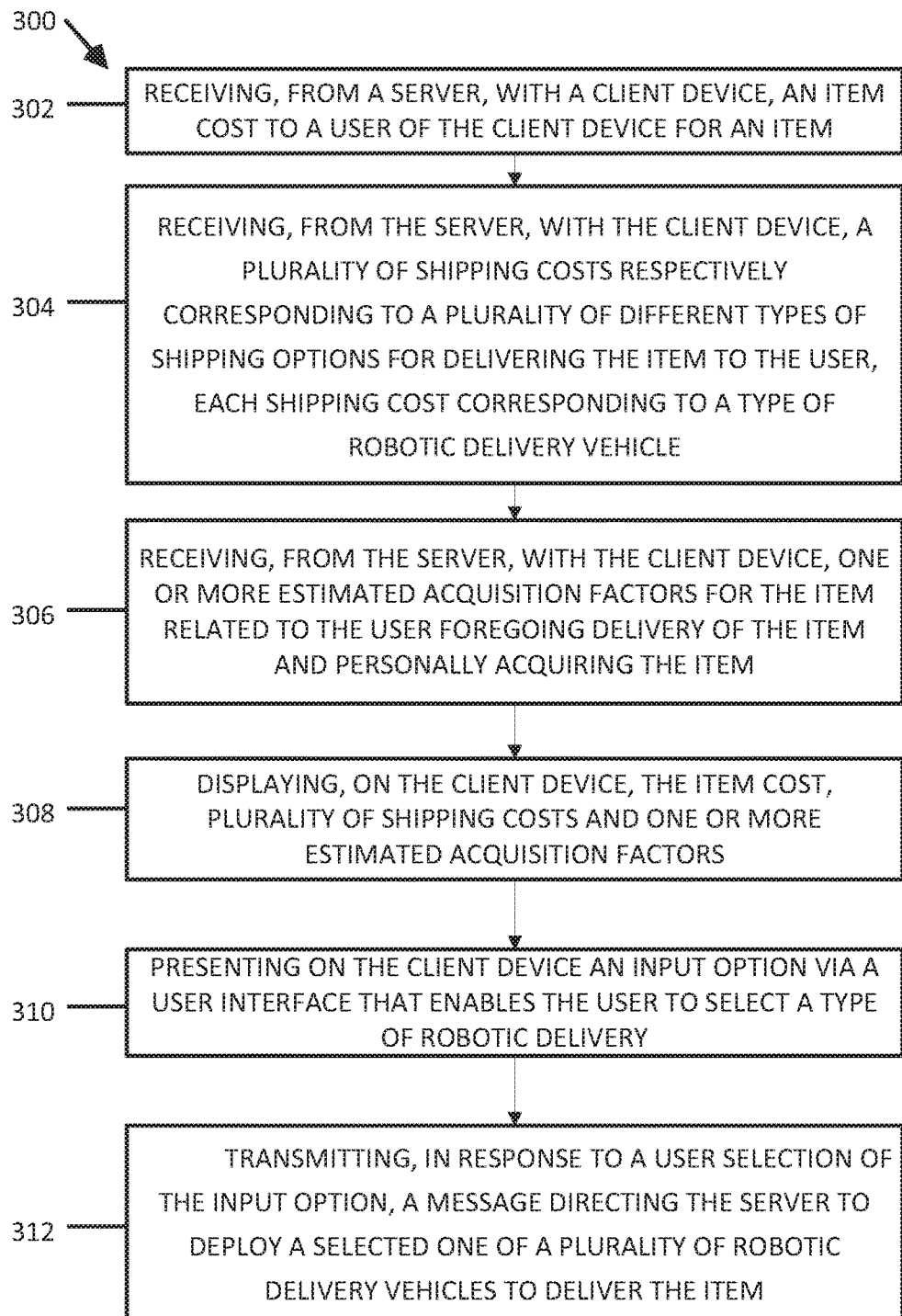
FIG. 3 is a flowchart illustrating a process for deploying a robotic delivery vehicle according to an exemplary embodiment.

FIG. 3 is a block diagram 300 illustrating a process 300 for deploying a robotic delivery vehicle according to an exemplary embodiment.

A mobile application can receive, from the server 104, an item cost to a user of the client device for an item in operation 302. The mobile application can execute on a client device such as a mobile device 102 running the Android™, iOS, and Windows Mobile™ operating systems. The mobile application can be developed in programming languages supported on the respective operating systems, including Objective C, C++, Java, C#, and Swift. The receiving can be facilitated by a network data connection, utilizing transport layers including transmission control protocol (TCP) user datagram protocol (UDP), or any other suitable transport layer. The item cost can be included in the implementation of an Open Systems Interconnection (OSI) model application layer. OSI model lower layer implementations can be implemented through any interface that supports the transmission of an upper layer containing the item cost. The item cost can include a decimal representation of the cost of the item, as well as an indication of what currency the decimal representation is provided. The item cost can be stored or packaged in any data structure capable of containing it, including programming language supported classes and structs.

In operation 304, the mobile application can receive, from the server 104, shipping costs respectively corresponding to different types of shipping options for delivering the item to the user. Each shipping cost can correspond to a type of robotic delivery vehicle. Similar to the item cost, the shipping costs can be received using a similar transport method. The shipping costs include separate costs for the robotic delivery vehicle, including UAV and AGV. Additionally, shipping costs for traditional delivery options, such as ground freight or overnight express, can be included as points of reference for the user to compare. The robotic delivery shipping costs can implicitly or explicitly include fuel costs, repair costs, operating costs, insurance costs, and depreciation. Additionally, shipping costs can include discounting based on a shared cost for multiple deliveries in a same geographic region. Similarly to the item costs, the shipping costs can be represented as a data structure capable of containing the shipping costs. The shipping costs can be independent structures or can use programming language inherency to provide for simplified interfaces for accessing member variables and functions, as well as promoting efficiency and code reuse. In an exemplary embodiment, the item cost and the shipping costs can have a shared base class to provide a common interface to both.

In operation 306, the mobile application can receive, from the server 104, one or more estimated, contemporaneously generated acquisition factors for the item related to the user foregoing delivery of the item and personally acquiring the item. The acquisition factors for the item can be generated based on real-time data including the current time of day, estimated drive time, current traffic conditions and current weather conditions. The acquisition factors can also include associated depreciation of vehicular cost to acquire the item. In the event of the item being selected by a personal shopper, the acquisition factor can include a cost related to the employment of the personal shopper. In some instances, some lost opportunities costs to acquire the item such as lost hourly wages and billing can be included. The lost opportunity costs can be derived from user profile information accessible by the mobile application.

Additionally, the mobile application can receive suggested items from the server. Suggestive items can be selected by having a set of properties suitable for delivery by the robotic delivery vehicle. Properties of suitable suggestive items can include product dimensions and weight. Items can also be suggested based on the identity of the user and the type of the selected item. For instance, related items to the selected item can be suggested items. User identity can be used to determine the suggested items. For instance, a user's purchase history can be the basis for suggested items.

In operation 308, the mobile application can display, on the client device, the item cost, shipping costs and one or more estimated acquisition factors. The item cost, shipping costs and the acquisition factors can be converted to displayable objects based on the frameworks of their respected operating systems. Data adapters to support displayable objects can be employed to link the raw data objects indicating costs and factors, to their displayable objects. The data adapters can provide implementation parameters relating to the position and appearance of the raw data objects to effectively and efficiently decouple the raw data objects from the displayable objects. Any suggested items can also be displayed on the client device.

In operation 310, the mobile application can present an input option via a user interface for the user to select a type of robotic delivery. An input option can include an indicative radio button implementation rendered in the user interface, where the radio button corresponds to one of the shipping options. A button can be instantiated to provide submission of the selected radio button. Alternatively, a spinner widget can be utilized for the same purpose. A drop down menu can also facilitate an input option in a user interface to select the type of robotic delivery. The input option can provide the selectable types of robotic delivery options in a mutually exclusive manner. Additionally the users interface can present the user an option to select at least one of the suggested items as well.

In operation 312, in response to user selection of the input option, the mobile application can transmit a message directing the dispatch module 106 to trigger the deployment a selected one of the plurality of robotic delivery vehicles to deliver the item. The user selection is forwarded through the server 104 to the dispatch module 106. The dispatch module 106 notifies an attendant of the item to be shipped and the robotic delivery vehicle selected. The attendant loads the item onto the selected robotic delivery vehicle. Upon loading, the dispatch module 106 automatically deploys the robotic delivery vehicle to deliver the item. In another embodiment, upon receipt of the selection of the input option, the server 104 can automatically notify a third party shipper of the impending shipment, automatically update inventory, or receive payment from the user. Additionally upon the selection of any suggested items, the mobile application transmits the selection of the suggested item.

Figure 4:
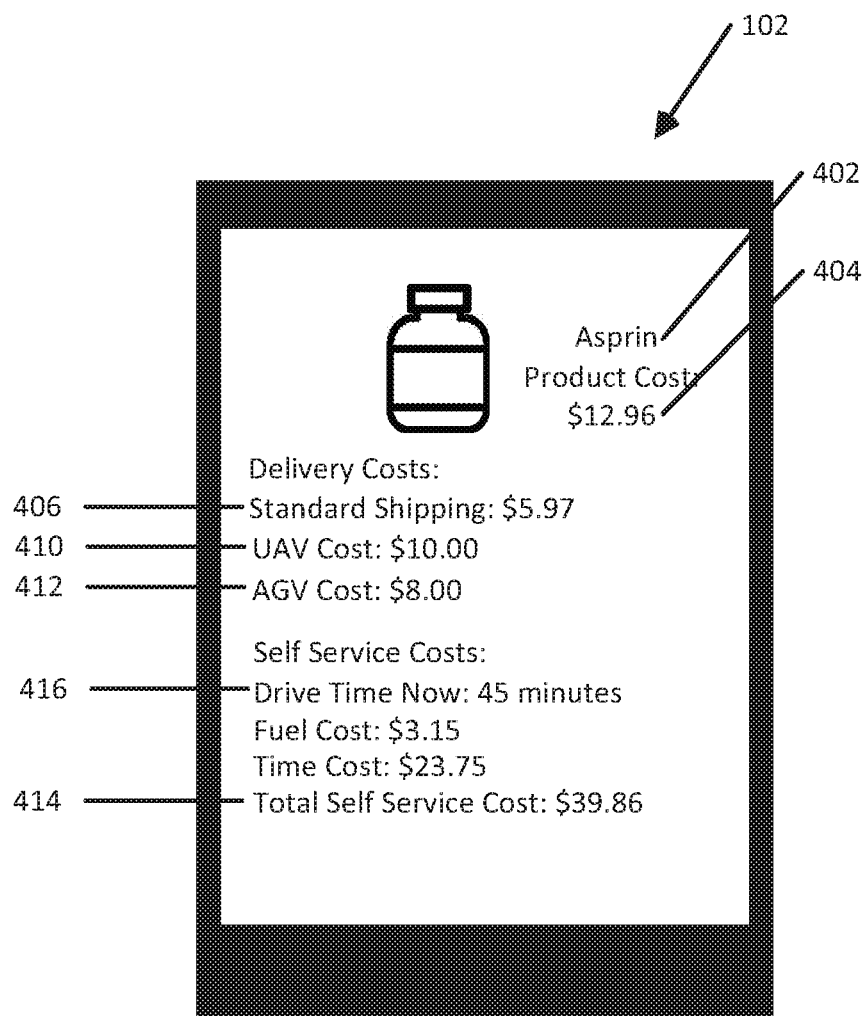
FIG. 4 illustrates a graphical user interface of a mobile application for presenting costs to a consumer according to an exemplary embodiment.

FIG. 4 illustrates a display of a mobile device rendering a graphical user interface generated by a mobile application according to an exemplary embodiment. The mobile application executes on a mobile device 102. The mobile application, via the graphical user interface, presents the user with a product description 402. The product description 402 can include the name of the product, the unit size of the product, or an image of the product. Additionally, a unit cost 404 for the product is displayed. The mobile application 402 can provide the user with information relating to shipping options. The shipping options can include a standard shipping rate 406, a UAV cost 410, an AGV cost 412, and a self-service cost 414. Additionally, the mobile application can include an indication of time costs 416. The time costs 416 can be determined based on the shipping source and the shipping destination based on the location of the mobile device 102 at the time of ordering.

Figure 5:
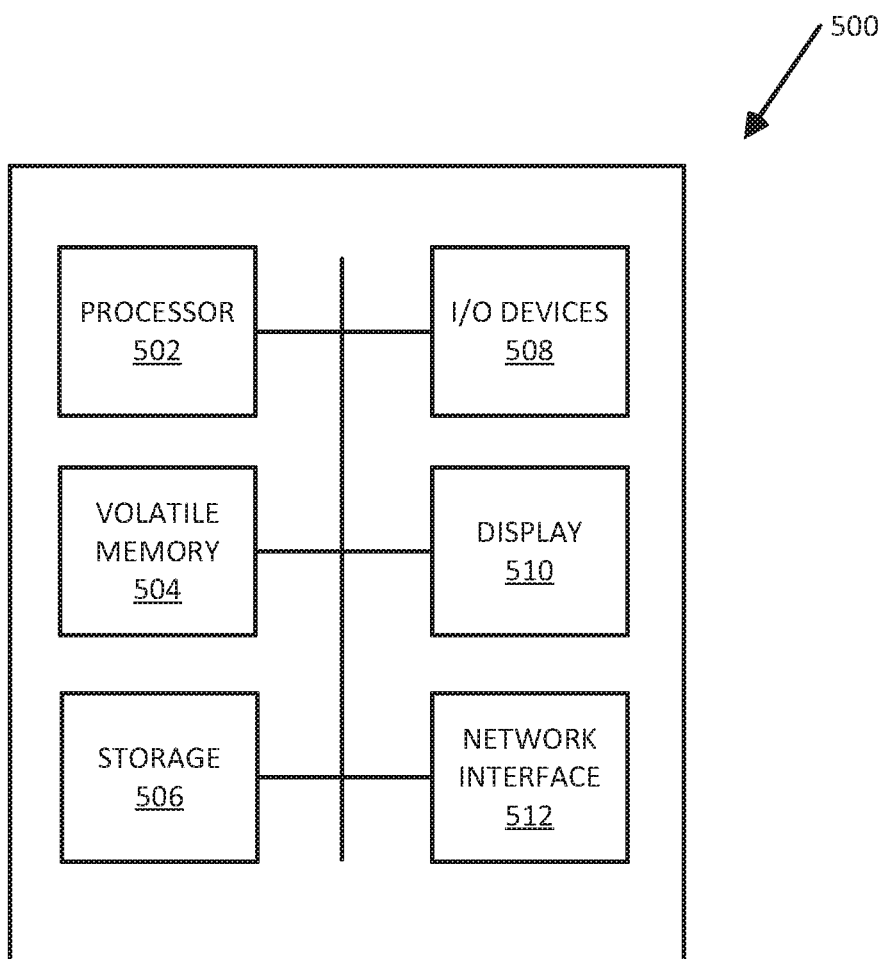
FIG. 5 is a block diagram illustrating an exemplary computing device suitable for use in an exemplary embodiment.

FIG. 5 is a block diagram illustrating an exemplary computing device suitable for use in an exemplary embodiment. Computing device 500 can execute the mobile application. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, volatile memory 504 included in the computing device 500 can store computer-readable and computer-executable instructions or software (e.g., mobile applications) for implementing exemplary operations of the computing device 500. The computing device 500 also includes configurable and/or programmable processor 502 for executing computer-readable and computer-executable instructions or software stored in the volatile memory 504 and other programs for implementing exemplary embodiments of the present disclosure. Processor 502 can be a single core processor or multiple core processor. Processor 502 can be configured to execute one or more of the instructions described in connection with computing device 500.

Volatile memory 504 can include a computer system memory or random access memory, such as DRAM, SRAM, EDO RAM, and the like. Volatile memory 504 can include other types of memory as well, or combinations thereof.

A user can interact with the computing device 500 through a display 510, such as a computer monitor, which can display one or more graphical user interfaces supplemented by I/O devices 508, which can include a multi touch interface, a pointing device, an image capturing device and a reader.

The computing device 500 can also include storage 506, such as a hard-drive, CD-ROM, or other computer readable media, for storing data and computer-readable instructions and/or software that implement exemplary embodiments of the present disclosure (e.g., applications). For example, storage 506 can include one or more databases 110A, 110B for storing information associated with product pricing information and product packaging information and can be indexed accordingly. The databases 110A, 110B can be updated manually or automatically at any suitable time to add, delete, and/or update one or more data items in the databases.

The computing device 500 can include a network interface 512 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 512 can include one or more antennas to facilitate wireless communication between the computing device 500 and a network and/or between the computing device 500 and other computing devices. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein.

Figure 6:
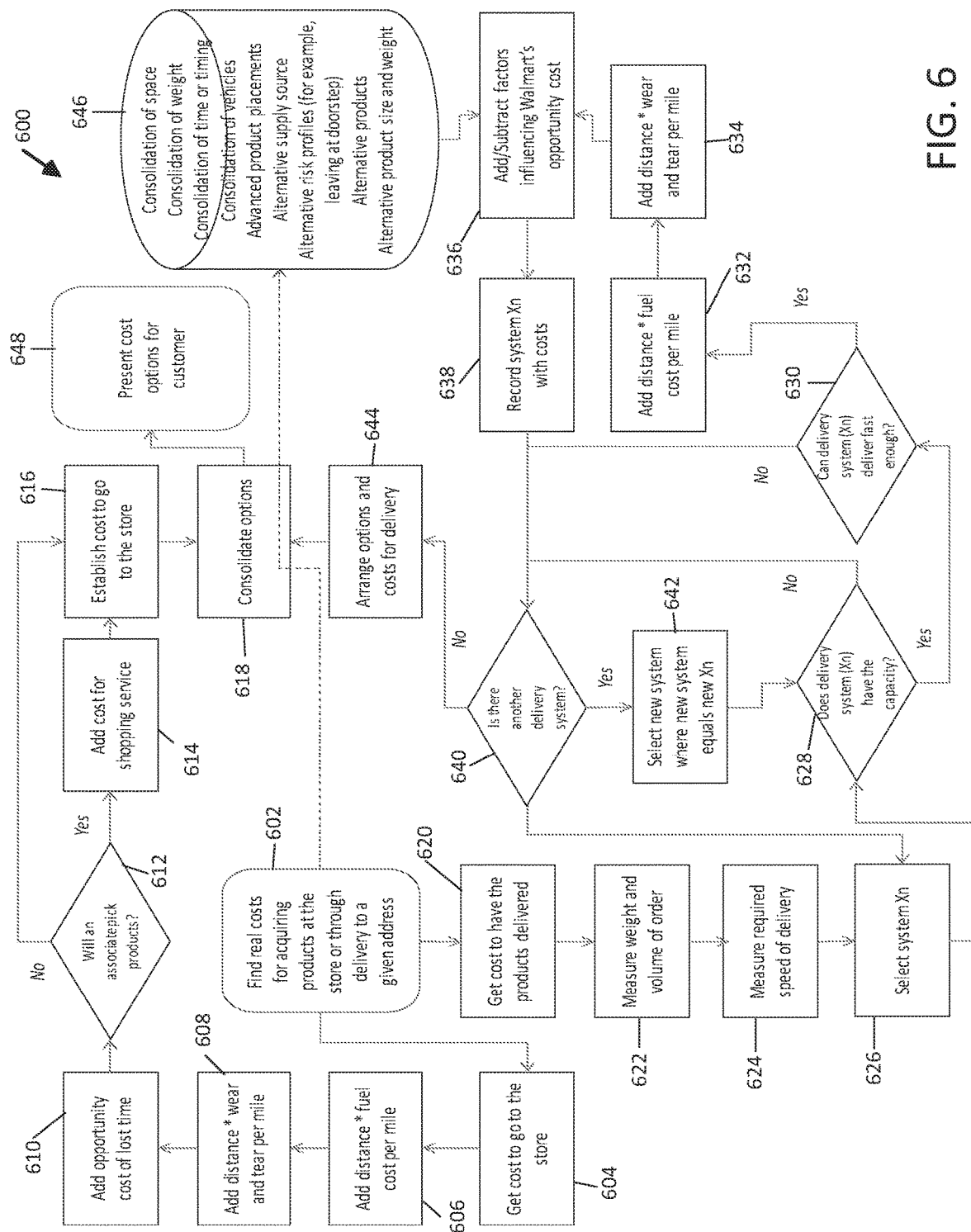
FIG. 6 is a flowchart illustrating an exemplary embodiment of the processing of a mobile application.

FIG. 6 is a flowchart 600 illustrating an exemplary embodiment of the processing of a mobile application. The processes described here may be accomplished on the mobile device 102, the server 104 or any combination thereof. The "self-service" processing begins at step 602 where the goal is to find real costs for acquiring products at the store or through a delivery to a given address. At step 604, the cost to go to the store is obtained. At step 606 the cost per mile in terms of distance multiplied by fuel cost is added. At step 608, "wear and tear" depreciation is added. At step 610, the cost of lost opportunity as in terms of lost time is added. At step 612, the determination of whether an associate picks products is made. If an associate is required to pick products, a cost of the shopping service is added at step 614. In both cases where an associate picks product or not, a cost for the user to go to the store is established at step 616. All available options for obtaining the products are consolidated at step 618. All cost options are presented for the customer at step 648.

The delivery processing begins at step 602 where the goal is to find real costs for acquiring products at the store or through a delivery to a given address. The cost to have the products delivered is acquired at step 620. The weight and volume of the order is measured at step 622. At step 624, the speed of delivery required is measured. At step 626, delivery system Xn is selected. At step 628, the available capacity of delivery system (Xn) is determined against the weight and volume of the order. If delivery system (Xn) has enough capacity, the delivery speed of delivery system (Xn) is determined against the required speed of the order at step 630. At step 632, a fuel cost is added as a function of distance times fuel cost per mile. At step 634, a depreciation factor is included in terms of adding distance time "wear and tear" per mile. At step 636, an opportunity cost is added or subtracted. Opportunity costs factors include consolidation of space, consolidation of weight, consolidation of time or timing, consolidation of vehicles, advanced product placements, alternative supply source, alternative risk profiles, alternative products, and alternative product size and weight as demonstrated at step 646. After including opportunity costs, system (Xn) with its costs are recorded at step 638. Upon reaching a decision that system (Xn) does not have capacity (step 628), system (Xn) cannot deliver fast enough (step 630), or the system costs of (Xn) have been included (step 638), the process iterates at step 640, where any additional systems are processes. Upon the determining that additional delivery systems are available, at step 642, a new system is selected and equals system Xn. If there are no additional delivery systems as determined at step 640, the options and costs for delivery are arranged at step 644.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A distributed robotic delivery system comprising:
   a dispatch module executable on a server and configured to deploy a selected one of a plurality of robotic delivery vehicles associated with a facility;
   a dispatch application executable on a client device that is communicatively coupled to the server, the dispatch application when executed:
      receives, from the server, suggested items for purchase, the suggested items selected by having a set of properties suitable for delivery by the selected one of the plurality of robotic delivery vehicles, wherein the set of properties includes product dimensions and weight;
      receives, from the server, item costs to be provided to a user of the client device for the suggested items;
      displays, on the client device, the item costs; and
      transmits a message directing the dispatch module to deploy the selected one of the plurality of robotic delivery vehicles to deliver one or more items of the suggested items selected by the user;
   wherein the dispatch module sends one or more commands to the facility based on the message to load the selected one of the plurality of robotic delivery vehicles with the one or more items and dispatch the selected one of the plurality of robotic delivery vehicles to the user.

2. The distributed robotic delivery system of claim 1, wherein the dispatch application when executed further:
   displays, on the client device, a listing of the suggested items along with the item costs;
   presents a second input option for the user to select at least one of the suggested items; and
   transmits, in response to a user selection, an indication of the at least one selection to the dispatch module,
   wherein the dispatch module sends the one or more commands to the facility based on the indication to load the selected one of the plurality of robotic delivery vehicles with the one or more items of the suggested items selected by the user.

3. The distributed robotic delivery system of claim 2 wherein the suggested items is further based on at least one of an identity of the user and a type of the one or more items of the suggested items selected by the user.

4. The distributed robotic delivery system of claim 1, wherein the plurality of robotic delivery vehicles comprise unmanned aerial vehicles and autonomous ground vehicles.

5. The distributed robotic delivery system of claim 1, wherein the dispatch application when executed further displays one or more estimated acquisition factors comprising at least one of an estimated drive time, a current weather condition, a current traffic condition and a time of day.

6. The distributed robotic delivery system of claim 5, wherein the dispatch module is communicatively coupled to one or more databases holding information regarding current weather conditions and current traffic conditions.

7. The distributed robotic delivery system of claim 1, wherein the dispatch application when executed additionally displays a plurality of shipping costs respectively corresponding to a plurality of different types of shipping options for delivering the suggested items to the user, each shipping cost corresponds to a type of a robotic delivery vehicle.

8. The distributed robotic delivery system of claim 7, wherein the plurality of shipping costs include discounting based on a shared cost for a plurality of deliveries in a same geographic region.

9. The distributed robotic delivery system of claim 1, wherein the dispatch application is a mobile device application.

10. The distributed robotic delivery system of claim 1, wherein the dispatch module when executed determines item placement in relation to a payload bay of the selected one of the plurality of robotic delivery vehicles, the payload bay secures the one or more items of the suggested items selected by the user.

11. A method for dispatching robotic delivery vehicles, comprising:
- receiving, at the dispatch application from a server communicatively coupled to the dispatch application, suggested items for purchase, the suggested items selected by having a set of properties suitable for delivery by a selected one of a plurality of robotic delivery vehicles, wherein the set of properties includes product dimensions and weight;
- receiving, at the dispatch application from the server, item costs to be provided to a user for the suggested items;
- displaying, by the dispatch application on the client device, the item costs; and
- transmitting a message directing the server to deploy the selected one of the plurality of robotic delivery vehicles to deliver one or more items of the suggested items selected by the user,
- wherein the server sends one or more commands to a facility based on the message to load the selected one of the plurality of robotic delivery vehicles with the one or more items of the suggested items selected by the user and dispatch the selected one of the plurality of robotic delivery vehicles to the user.

12. The method of claim 11, further comprising:
- displaying, on the client device, a listing of the suggested items along with the item costs;
- presenting a second input option for the user to select at least one of the suggested items; and
- transmitting, in response to a user selection, an indication of the at least one selection to a dispatch module;
- wherein the dispatch module sends the one or more commands to the facility based on the indication to load the selected one of the plurality of robotic delivery vehicles with the at least one selected item.

13. The method of claim 12, wherein the suggested items is further based on at least one of an identity of the user and a type of the one or more items of the suggested items selected by the user.

14. The method of claim 11, wherein the plurality of robotic delivery vehicles comprise unmanned aerial vehicles and autonomous ground vehicles.

15. The method of claim 11, wherein the dispatch application when executed further displays one or more estimated acquisition factors comprising at least one of an estimated drive time, a current weather condition, a current traffic condition and a time of day.

16. The method of claim 15, wherein the dispatch module is communicatively coupled to one or more databases holding information regarding current weather conditions and current traffic conditions.

17. The method of claim 11, further comprising displaying, by the dispatch application, a plurality of shipping costs respectively corresponding to a plurality of different types of shipping options for delivering the suggested items to the user, each shipping cost corresponds to a type of a robotic delivery vehicle.

18. The method of claim 17, wherein the plurality of shipping costs comprise discounting based on a shared cost for a plurality of deliveries in a same geographic region.

19. The method of claim 11, wherein the dispatch application is a mobile device application.

20. The method of claim 11, further comprising determining, by the dispatch module, item placement in relation to a payload bay of the selected one of the plurality of robotic delivery vehicles, the payload bay secures the one or more items of the suggested items selected by the user.

* * * * *